Feb. 14, 1939. M. BARRY 2,146,927
MACHINE FOR CEMENTING SOLES TO SHOES
Filed May 11, 1933 6 Sheets-Sheet 1

Inventor.
Maurice Barry
by Heard Smith & Tennant.
Attys.

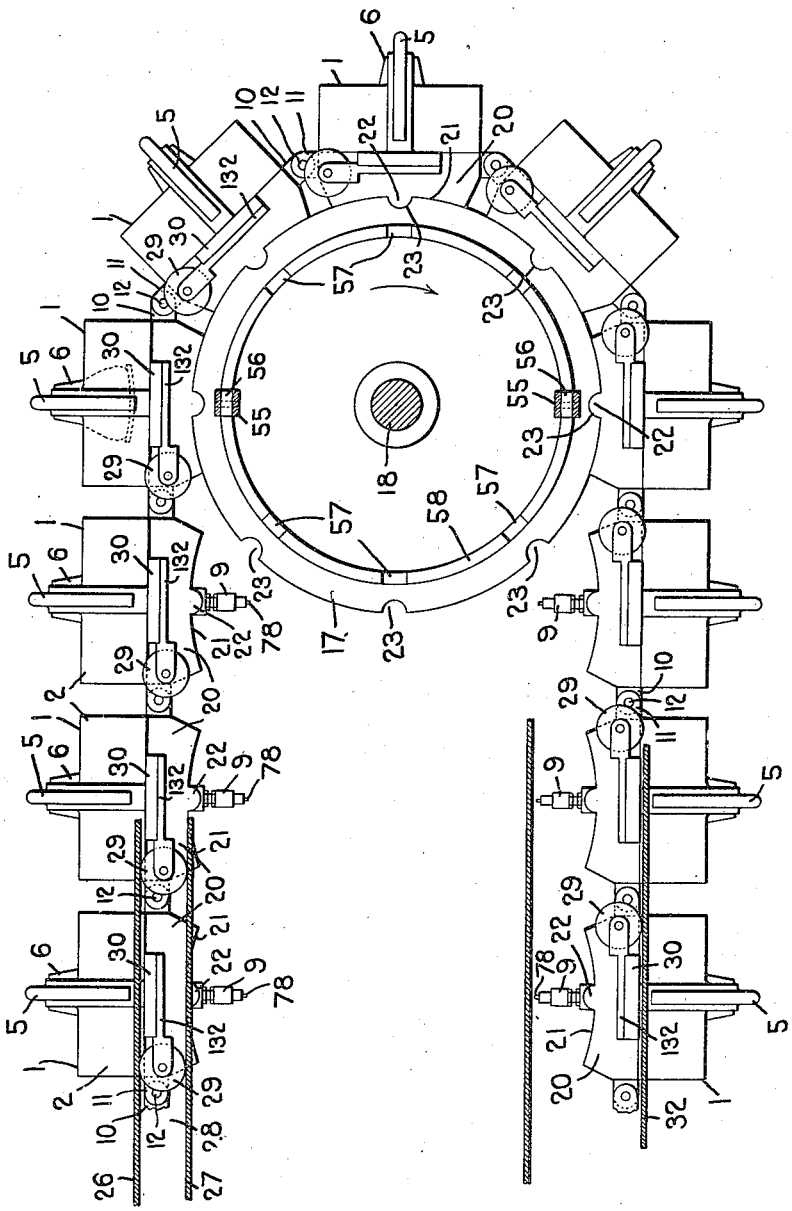

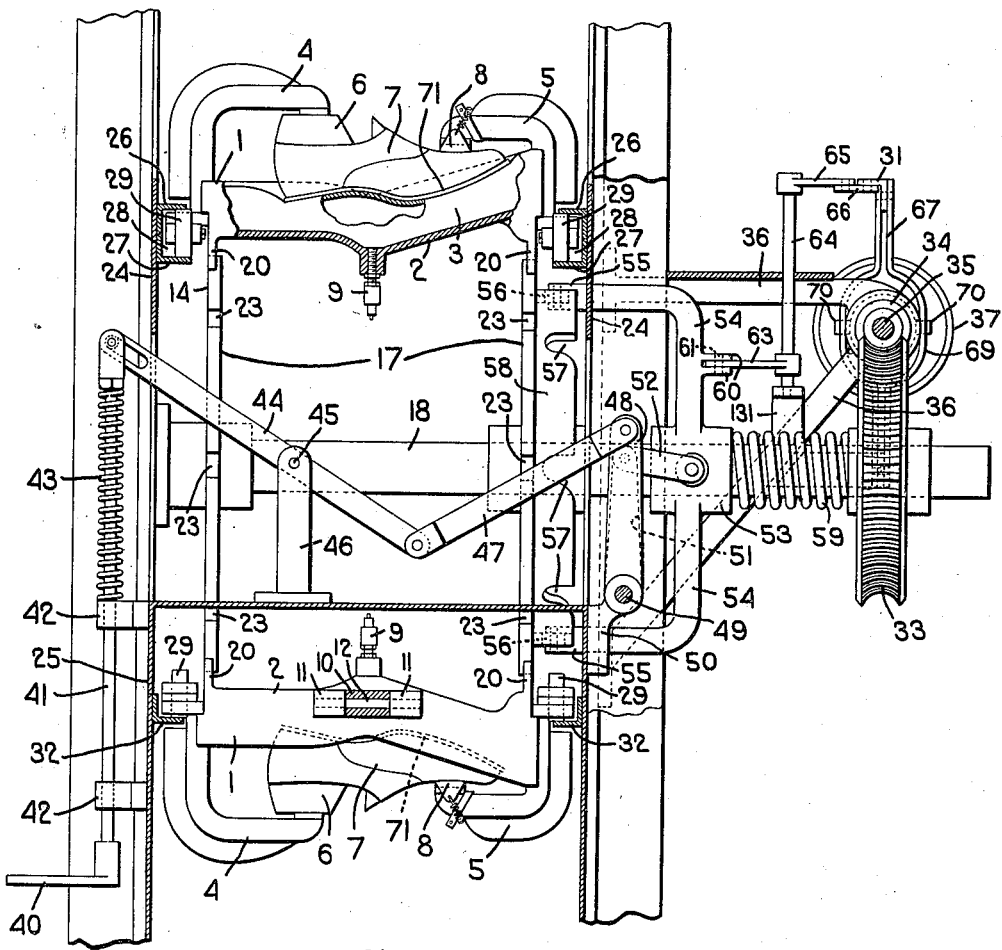

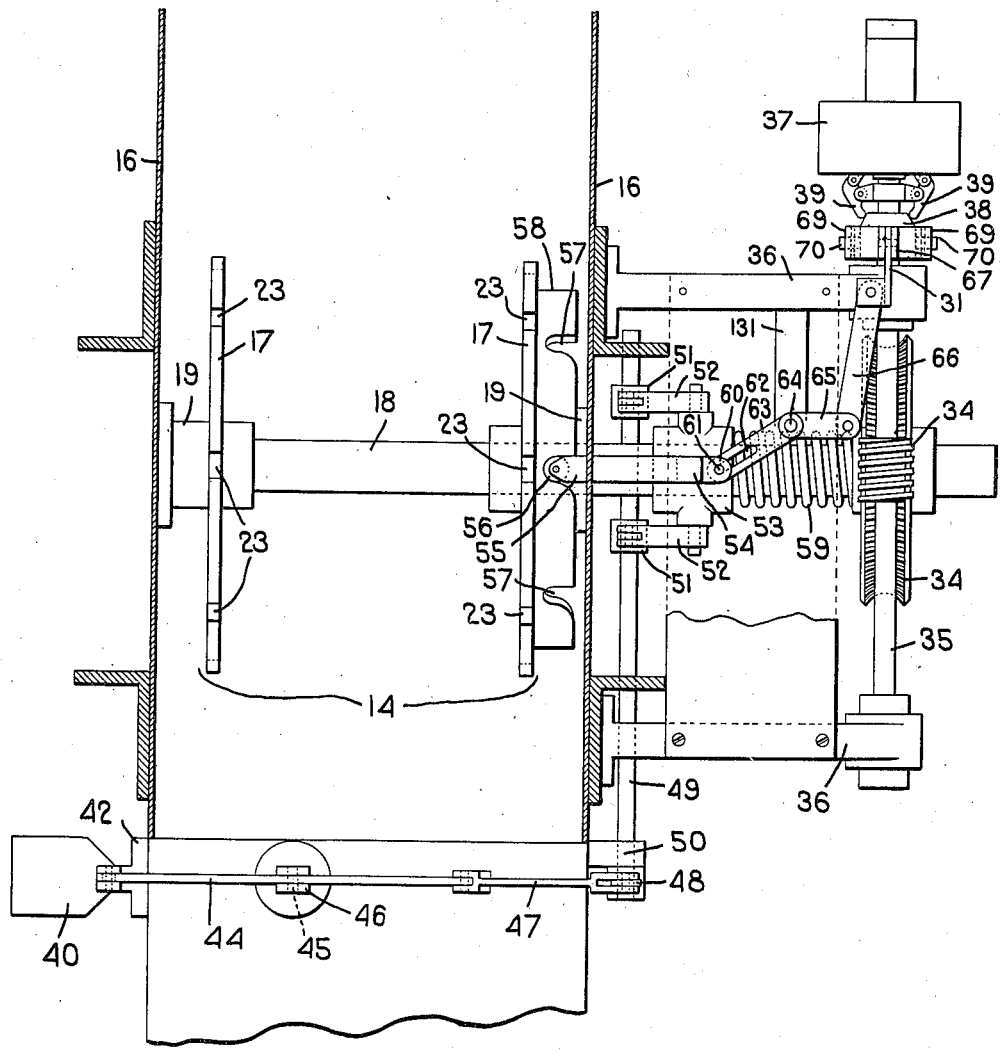

Feb. 14, 1939. M. BARRY 2,146,927
MACHINE FOR CEMENTING SOLES TO SHOES
Filed May 11, 1933 6 Sheets-Sheet 5
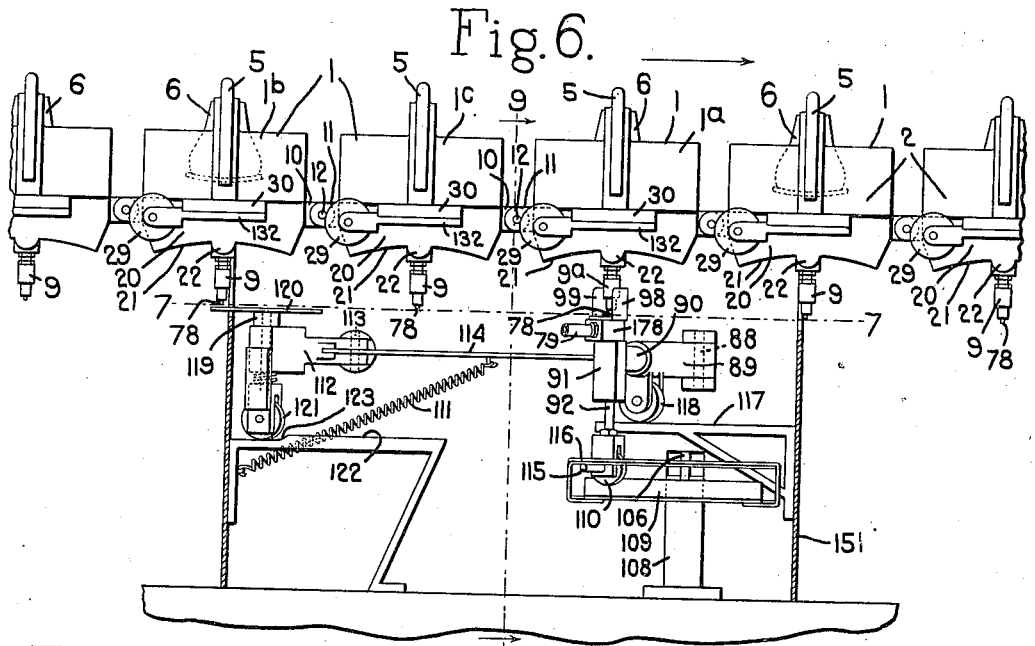
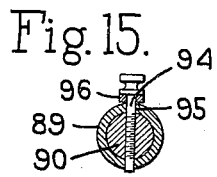
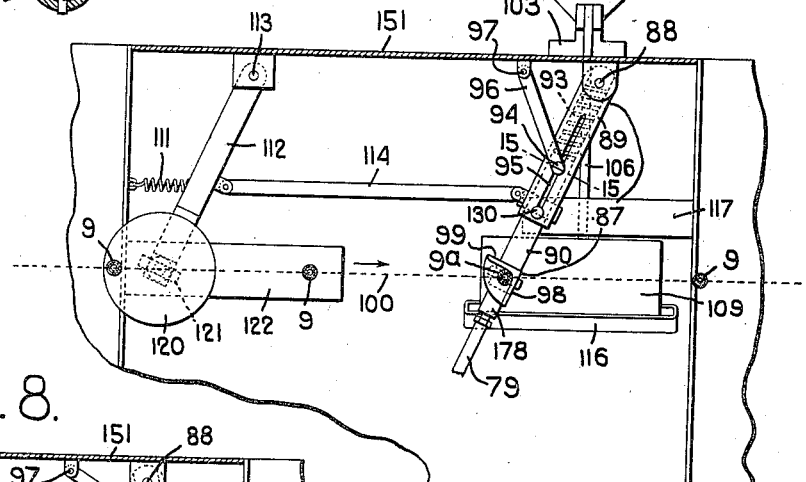
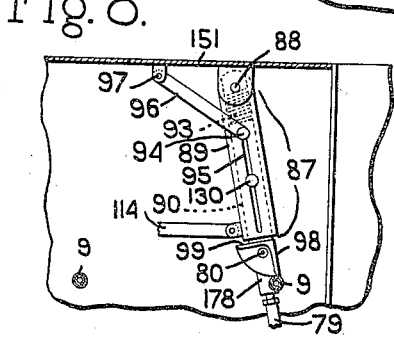
Inventor.
Maurice Barry
by Heard Smith & Tennant.
Attys.

Feb. 14, 1939. M. BARRY 2,146,927
MACHINE FOR CEMENTING SOLES TO SHOES
Filed May 11, 1933 6 Sheets-Sheet 6
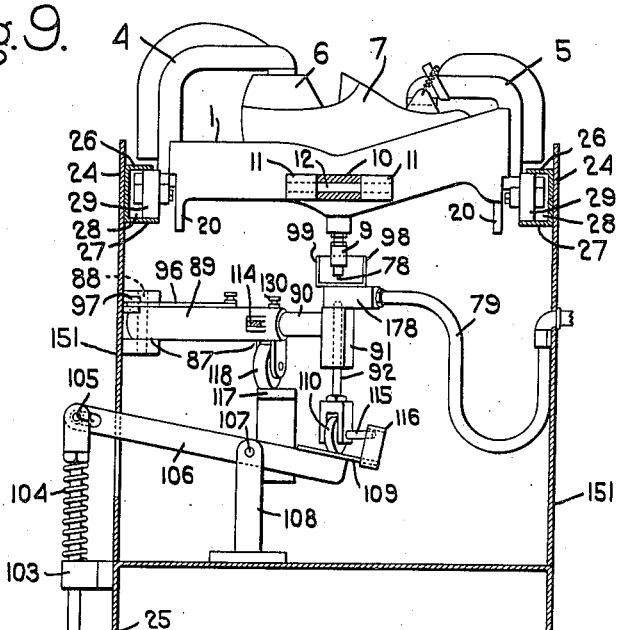
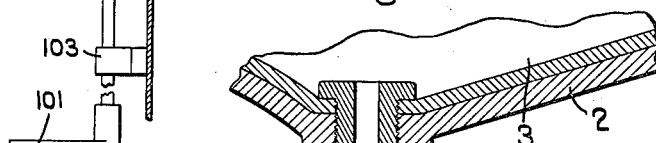
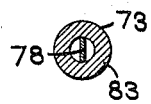
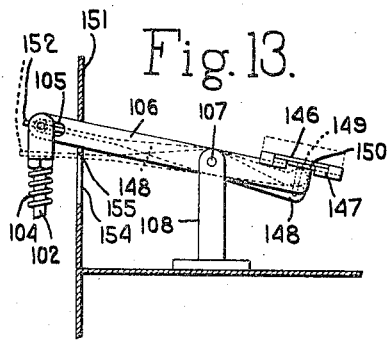
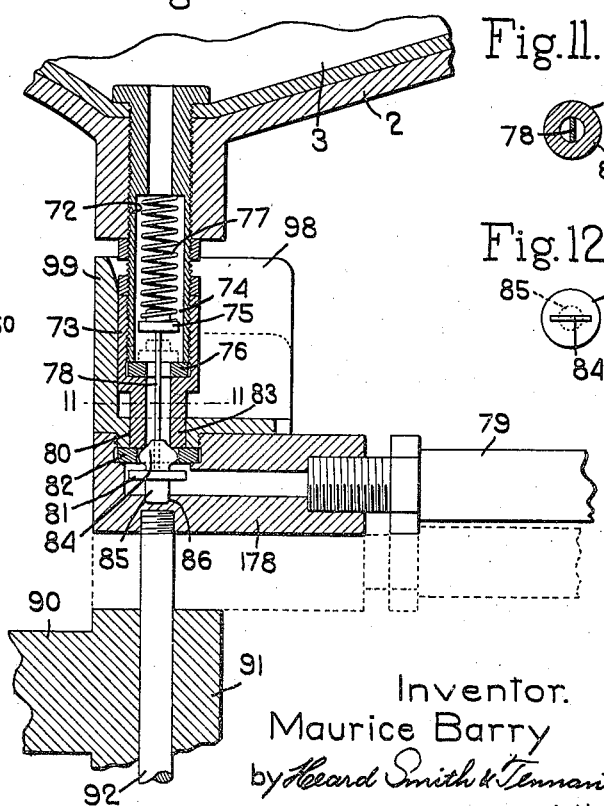
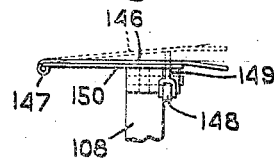
Inventor.
Maurice Barry
by Heard Smith & Tennant.
Attys Patented Feb. 14, 1939

2,146,927

UNITED STATES PATENT OFFICE 2,146,927

MACHINE FOR CEMENTING SOLES TO SHOES

Maurice Barry, Chelsea, Mass.

Application May 11, 1933, Serial No. 670,471

19 Claims. (Cl. 12—36)

This invention relates to machines for cementing soles to shoes and particularly to that type of machine which involves a plurality of travelling sole-pressing units each adapted to receive a shoe and apply pressure to the sole thereof.

In the present invention these travelling units are preferably connected together to produce an endless chain structure and one feature of my invention relates to a novel means for actuating the connected or articulated sole-pressing units so as to bring them successively into position to have a shoe and its sole placed therein.

The sole-pressing units herein illustrated each include an inflatable pad together with means for holding a shoe in position with the sole resting against the pad, and another feature of the invention relates to a novel means for inflating each pad thereby to apply the desired pressure to the sole of the shoe.

Another feature of the invention relates to novel means for relieving the pressure in each pad at the proper point in the cycle of operations.

In an organized machine embodying the invention the sole-pressing units are connected together in an endless chain formation which is moved forward with a step-by-step motion whereby the units are brought successively into loading position, in which position each unit is adapted to receive a shoe with its assembled sole. When the shoe and the sole to be cemented thereto have been placed in the unit, the pad is inflated thus applying the necessary pressure to the sole of the shoe. The endless chain structure is then moved forward one step to bring another unit into loading position and another shoe with its assembled sole is placed in said unit. This operation is repeated again and again, each unit having a shoe placed therein as it comes into loading position.

The pressure is maintained on each inflatable pad while it is making the circuit of the endless chain formation and as each unit approaches the loading position the pressure in the pad will be relieved so that the shoe can be removed and its place taken by another shoe. The time required for each unit to make the circuit of the endless chain structure is sufficient to enable the cement to set.

In order to give an understanding of the invention I have illustrated in the drawings some selected embodiments thereof which will now be described after which the novel features will be pointed out in the appended claims.

Fig. 3 is a fragmentary sectional view illustrating a portion of the articulated sole-pressing units and the means for driving the same;

Fig. 4 is an enlarged section on the line 4—4 Fig. 1;

Fig. 5 is a plan view of Fig. 4 with the sole-pressing units omitted;

Fig. 6 is a fragmentary view showing the means for inflating and deflating the inflatable pads;

Fig. 7 is a view on substantially the section line 7—7, Fig. 6;

Fig. 8 is a fragmentary view showing a portion of the pad-inflating means;

Fig. 9 is a sectional view on substantially the line 9—9, Fig. 6;

Fig. 10 is a fragmentary sectional view showing the pad-inflating connections;

Fig. 11 is a section through the valve stem on the line 11—11, Fig. 10;

Fig. 12 is a plan view of the valve in the air delivery nozzle;

Fig. 13 is a fragmentary sectional view showing a modified form of control for the air and the driving mechanism;

Fig. 14 is a side view of Fig. 13;

Fig. 15 is an enlarged section on the line 15—15, Fig. 7;

Fig. 16 is a fragmentary view showing the clutch-operating lever;

Figure 1:
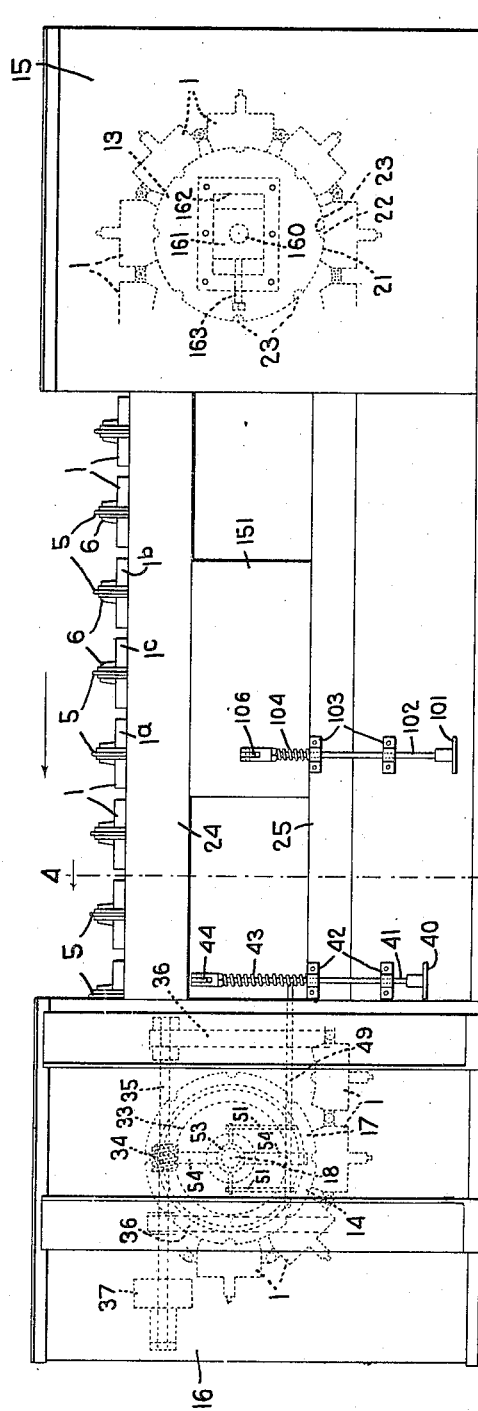
Fig. 1 is a side view of a machine embodying my invention.

As stated above my sole-pressing machine includes a plurality of travelling sole-pressing units which are preferably articulated together in the form of an endless chain arrangement, each unit including an inflatable pad and shoe-positioning means to hold the shoe in position with the sole pressed against the pad. Each individual sole-pressing unit is indicated at 1 and each comprises a supporting base or frame 2 (see Fig. 4) together with an inflatable pad 3 mounted thereon. The base or frame 2 is provided with shoe-holding means in the form of two oppositely-disposed overhanging arms 4 and 5, the arm 4 being adapted to engage the heel portion 6 of a last on which the shoe 7 to be operated on is mounted, and the arm 5 being provided with a pad 8 to rest against the toe portion of the shoe. Each sole-pressing unit is also provided with an air-inlet nozzle, indicated generally at 9, through which the pad 3 may be inflated, said nozzle being provided with a suitable valve, presently to be described, to prevent deflation of the pad. These sole-pressing units 1 are articulated together in the form of an endless chain arrangement.

The base 2 of each unit is provided at one end with an ear 10 adapted to be received between two complemental ears 11 extending from the adjacent end of the base 2 of an adjacent unit, said ears being interleaved and pivotally connected together through a pivot pin 12.

This endless chain structure is carried by and travels around two sprocket wheel assemblies 13, 14 which are shown as received in housings 15 and 16 respectively. The sprocket wheel assembly 14 is the driving element and it comprises two disks 17 mounted on a driving shaft 18 which is journalled in suitable bearings 19 carried by the sides of the housing 16. The opposite sides of each base or frame 2 are provided with flanges 20 which ride on the disks 17, the edges 21 of these flanges being curved to fit the periphery of the disk and each flange being formed with a projection 22 adapted to enter one of a plurality of notches 23 with which the periphery of the disk 17 is provided. These notches 23 are spaced apart a distance equal to the spacing of the units 1. The engagement of these projections 22 in the notches 23 forms a driving connection between the disks 17 and the articulated sole-pressing units 1 so that as the disks are rotated the endless chain structure of articulated units will be moved forward.

The upper and lower runs of this endless chain structure are guided in suitable guides carried by the longitudinal members 24, 25 which extend between the housings 15 and 16. There is a longitudinal member 24 on each side of the machine and such member 24 is provided with the two angle iron guides 26, 27 which form between them a channel 28 to receive a roll 29 with which each shoe-pressing unit is equipped. There is a roll 29 on each side of each unit and each roll 29 is shown as mounted in a bracket member 30 which is secured to a flange 31 projecting from the side of the base or frame 1. The rolls are shown as positioned adjacent the end of each unit and during the travel of the units through the upper run of the endless chain arrangement these rolls are travelling in the channels 28, one on each side of the machine. For supporting the lower run of the endless chain structure the lower guide member 25 on each side of the machine is provided with an angle iron track or way 32 on which the rolls 29 rest.

The sprocket wheel assembly 13 is in the form of an idler and it comprises the two disks 17 similar to the disks of the sprocket wheel structure 14 and which disks co-operate with the flanges 21 and their projections 22. This sprocket wheel assembly 13 is carried by a shaft 160 that is mounted at each end in an adjustable bearing block 161. Each bearing block is mounted for horizontal movement in a supporting frame 162 that is bolted to the side walls of the housing 15. The adjustment of the bearing blocks 161 in the supporting frame 162 is for the purpose of maintaining the proper degree of tension on the endless chain structure. The adjustment of the bearing blocks in the frame is secured by means of adjusting screws 163.

Means are provided for moving the connected units 1 forward with a step-by-step motion, whereby the units are brought successively into loading position and will remain at rest in such position.

While each unit is in loading position a shoe 6 and its assembled sole 71 are placed therein and the pad is inflated. The chain assembly then moves forward one step to bring another unit into position to be loaded and these operations are repeated. It might be remarked here that as each unit approaches its loading position the pad of said unit will be deflated so that when the unit arrives at the loading position the shoe which had been previously placed therein may be removed and the unit loaded with another shoe to which a sole is to be attached.

I have stated above that the shaft 18 is the driving shaft through which the endless chain structure is operated. This driving shaft may be driven from any suitable source of power. As herein shown it has fast thereon a worm gear 33 which meshes with a worm 34 on a power shaft 35, which shaft 35 is shown as journalled in suitable bracket arms 36. 37 indicates a driving pulley which is loose on the shaft 35 but which is adapted to be clutched thereto through any suitable clutch mechanism. The clutch herein shown is of the known type which is rendered operative by a clutch-actuating cone 38 slidably mounted on the shaft 35 and which engages with clutch-operating levers 39.

The parts are shown in Fig. 5 in the position they assume when the clutch is disengaged and the pulley 37 is loose on the shaft. When the clutch-actuating cone 38 is moved upwardly in Fig. 5 thereby to actuate the levers 39 the clutch will be thrown into engagement in a well-known way. Inasmuch as this particular clutch forms no part of my invention I have not thought it necessary to further illustrate it herein.

The driving clutch will be disengaged while each sole-pressing unit is being loaded with a shoe and its assembled sole, and when the shoe has been put in position and the pad has been inflated, the operator throws the clutch into engagement thereby clutching the driving pulley 37 to the shaft 35 and causing the connected travelling shoe-pressing units to be advanced one step or a distance equal to the spacing of the individual units 1.

Means are provided for locking the endless chain structure from movement when the clutch is disengaged and while the unit, which is in loading position, is being loaded with a shoe and its assembled sole. This locking means is associated with the clutch-actuating means so that the operation of throwing the clutch into engagement also unlocks the driving sprocket assembly 14.

The clutch is actuated through the medium of a treadle 40 which is shown as carried at the lower end of a treadle rod 41 which is mounted for vertical movement in bearngs 42 carried by the housing 16. This rod is acted on by a spring 43 which normally holds it in elevated position. The upper end of the rod is pivotally connected to one end of a lever 44 which in turn is pivotally mounted at 45 on a stand or support 46. The other end of the lever 44 is pivotally connected to a link 47 which connects said lever with an arm 48 rigid on a rock shaft 49 which is journalled in suitable bearings 50 carried by the housing 16. This rock shaft 49 has a pair of arms 51 rigid therewith, each of which is connected by a link 52 to a hub 53 that is slidably mounted on the shaft 18. This hub 53 is provided with two L-shaped arms 54, the ends 55 of which carry rolls 56 adapted to engage in locking notches 57 formed in a flange 58 extending laterally from one of the disks 17.

The hub 53 is acted on by a spring 59 which normally maintains the hub in the position shown in Figs. 4 and 5 and when in this position the locking arms 55 are in engagement with the notches 57 thereby locking the shaft 18 from rotation. The depression of the treadle 40 operates through the connections 44, 47, 48 and 52 to shift the hub 53 to the right Figs. 4 and 5 against the action of the spring 59 thereby withdrawing the locking arms 55 from the locking notches 57 and unlocking the endless chain structure. This same movement of the hub 53 also operates to shift the clutch-actuating cone 37 thereby throwing the clutch into engagement.

For this purpose one of the arms 54 is provided with two ears 60 carrying a pin 61 operating in a slot 62 formed in an arm 63 which is fast on a vertical rock shaft 64 that is journalled in a bracket 131. The upper end of the shaft 64 has another arm 65 fast thereto which is connected through the medium of link 66 and 31 to the upper end of a clutch-actuating lever 67. Said lever 67 is pivotally mounted at its lower end on a bracket 68 and is provided at its central portion with a yoke portion 69 that embraces the clutch-actuating cone 38. Said cone 38 has two oppositely-disposed pins 70 that enter slots formed in the sides of the yoke portion 69 so that as the lever 67 is swung away from the observer in Fig. 4 or upwardly in Fig. 5 the clutch-actuating cone 38 will be moved longitudinally of the shaft 35 thereby to throw the clutch into engagement. By this means the depression of the treadle 40 will unlock the sprocket wheel assembly and at the same time clutch the driving pulley 37 to the shaft 35. As soon as the clutch is engaged the shaft 18 begins to rotate slowly forward because of the worm and gear drive between the power shaft 35 and the driving shaft 18, and thus the endless chain arrangement will move slowly forward.

As soon as the sprocket wheel assembly 14 begins to turn the notches 57 will be moved out of line with the ends 55 of the locking arms and during continued rotation the rolls 56 will ride on the edge of the flange 58. As the disks 17 of the sprocket wheel assembly 14 continue to rotate other notches 57 will come into line with the ends 55 of the locking arms 54 and as soon as the notches are lined up with said arms the spring 59 will move the hub 53 formed thereby causing the rolls to enter the notches and locking the sprocket wheel structure from further rotation. This same movement of the hub 53 to the left in Figs. 4 and 5 will operate to disengage the clutch so that the disengagement of the clutch ocurs simultaneously with the locking of the sprocket wheel assembly.

The notches 57 are so spaced that the angular distance between adjacent notches is that corresponding to a movement of the endless chain structure required to move the connected units forward one step. In advancing the endless chain structure forward with a step-by-step movement, therefore, the operator simply depresses the treadle 40 and holds it depressed until the sprocket wheel structure 14 has started to advance. The operator may then release the pressure on the treadle and when the next notch 57 comes into alignment with the locking arms 55 the springs 57 will automatically disengage the clutch and cause the endless chain structure to be locked from further movement.

It will be understood that the shoe with its assembled sole is placed in each sole-pressing unit at a time when the pad is deflated. The machine embodies suitable means for inflating each pad after it has been loaded with a shoe 7 and its assembled sole 71.

The air-inlet nozzle 9 through which air is admitted to the inflatable pad is provided with an inwardly-opening check valve which permits inflation but prevents deflation of the pad. This nozzle is in the form of a valve casing comprising the exteriorly threaded part 72 and the interiorly threaded part 73 which has screw-threaded connection with the part 72, these parts forming between them a valve chamber 74 to receive a spring-pressed check valve 75 which normally seats against a valve seat 76. This valve is normally held to its seat by a spring 77 and the valve is provided with a stem 78, the end of which extends beyond the outer member 73 of the valve casing when the valve is seated.

Air is introduced into the inflatable pad through the medium of a delivery nozzle 178 which is connected by a flexible hose 79 to any suitable source of compressed air supply. This nozzle 178 is formed with an egress opening 80 which is controlled by a valve 81 seating against a valve seat 82. This valve 81 is normally held to its seat by the pressure in the nozzle. The egress opening 80 of the nozzle is of a size to receive the end 83 of the valve casing member 73 and in order to inflate the pad the nozzle 178 is brought into alignment with the pad nozzle 9 and the end 83 of said pad nozzle 9 is entered into the opening 80 as shown in Fig. 10. The valve 81 is formed with a wing 84 which when the valve 81 is seated extends through the opening in the valve seat 82. When the nozzle 178 is brought into register with the pad nozzle 9 and the end 83 of the valve is entered into the opening 80 of the nozzle 178 the wing 84 engages the end of the valve stem 78 thereby unseating the valve 75. The spring 77 is strong enough so that it will also unseat the valve 81.

The valve 81 is formed with a stem 85 adapted to enter a recess 86 in the nozzle 178 when the valve 81 is unseated, such stem and recess limiting the unseating movement of the valve 81. Consequently when the nozzles are brought into register as shown in Fig. 10 both valves 75 and 81 will be unseated and the air thus has a free passage from the delivery hose 79 through the nozzles 178 and 9 into the inflatable pad. The pad will thus be inflated to the required pressure. When the nozzles are separated the spring 77 closes the valve 75 against its seat 76 and the air pressure in the pipe connection 79 will close the valve 81 onto its seat 82.

I have provided herein means for automatically lining up the nozzle 178 with the pad nozzle 9 of the sole-pressing unit about to be loaded and this is accomplished by the movement of said unit into loading position.

The nozzle 178 is mounted on the end of an extensible swinging arm 87 which is pivoted at 88 to the housing 16. This arm 87 is formed with the tubular portion 89 which is pivoted at 88 and the extensible portion 90 which has a telescopic relation with the tubular portion 89. The extensible section 90 carries at its end a head 91 through which passes a vertical thrust rod 92 that is connected to the nozzle 178, (see Fig. 10). The thrust rod 92 can move vertically in the head 91 thereby to raise and lower the nozzle for reasons presently to be described.

The extensible member 90 of the arm 87 is acted on by a spring 93 which is confined within the tubular member 89 and which tends to urge the extensible member 90 outwardly. 130 indicates a stop pin secured to the extensible member 90 and operating in the slot 95, said stop pin serving to limit the outward or spring-pressed movement of said member 90. Said member 90 carries a pin 94 which extends through slots 95 formed in the tubular member 89 and which is connected to a link 96 pivoted to the housing at 97.

The nozzle 178 is formed with the two upstanding aligning flanges 98, 99 which are shown as placed at substantially right angles to each other and the purpose of which is to assist in aligning the aperture 80 of the nozzle with the end of the pad nozzle 9 of any unit during its travelling movement into loading position.

The arm 87 with the attached nozzle 178 is normally in the position shown in Fig. 7. The line of travel of the nozzles 9 of the sole-pressing units in the upper run is indicated by the dotted line 100 in Fig. 7. As each unit 1 approaches the loading position its nozzle 9 will engage the upstanding aligning flanges 98, 99 as shown by the nozzle 9a in Fig. 7. As the unit continues to move forward the engagement of the nozzle with the flanges 98, 99 will swing the arm 87 toward the right in Fig. 7 and during this swinging movement the link 96 operates to withdraw the extensible member 90 into the tubular member 89 and as a result the flanges 98, 99 will be travelling in substantially the straight line 100. These flanges 98, 99 serve to line up the nozzle 9 with the opening 80 of the air-delivery nozzle 178. When the parts have been thus lined up then the nozzle 178 is raised into its operative position shown in Fig. 10 thereby coupling the nozzles 9 and 178 so that the pad will be inflated. This raising of the nozzle 178 may be accomplished in any suitable way.

As shown in Figs. 6 to 9 I have provided a treadle 101 for this purpose which is attached to the lower end of a treadle rod 102 mounted for vertical movement in bearings 103 that are secured to the housing 16. This treadle is acted on by a spring 104 which normally holds it in raised position and the upper end of the treadle rod is connected by a pin and slot connection 105 with a lever 106 pivotally mounted at 107 on a supporting stand 108. This lever carries a plate 109 at its free end on which rests a roll 110 that is carried by the lower end of the thrust rod 92. The plate 109 is of sufficient length in the direction of the line of travel so that the roll 110 will not pass off from it during the swinging movement of the arm 87.

When the treadle 101 is depressed the end of the lever 101 carrying the plate 109 is raised and this raising movement operates through the thrust rod 92 to raise the nozzle 178 into position to connect with the nozzle 9 as shown in Fig. 10.

From the above it will be understood that as each sole-pressing unit 1 approaches its loading position the co-operation of the aligning flanges 98, 99 with the nozzle 9 will serve to line said nozzle up with the nozzle 178, and at the proper time in the cycle of operations the operative depresses the treadle 101 thereby coupling the nozzles and causing the pad to be inflated. When the inflation is completed the pressure on the treadle 101 is released and the spring 104 will then raise the treadle and lower the plate 109 thus allowing the nozzle 178 to drop into its inoperative position with regard to the valve 9.

In order to ensure that the nozzle 178 will move downwardly to withdraw the aperture 80 from the end 83 of the valve when the pressure on the treadle 101 is relieved, I have provided a connection by which the downward movement of the plate 109 is transmitted to the thrust rod 92. The lower end of the thrust rod 92 carries a laterally-extending pin 115, and the plate 109 is provided with a loop 116 which overlies the pin. This loop is shaped so as to permit the free movement of the roll 110 along the plate but whenever the plate moves downwardly the loop 116 engages the pin 115 and makes the downward or withdrawing movement of the nozzle 178 a positive one.

117 indicates a track or support for the arm 87, the latter carrying a supporting wheel 118 which rides back and forth on the track 117. The nozzle 9 is still in engagement with the flanges 98 and 99 after the nozzle 178 has been withdrawn from the end 83 of the nozzle 9. As the sole-pressing unit continues its movement after being inflated the engagement of the nozzle 9 with the aligning flanges 98, 99 causes the arm 87 to swing forwardly about its pivot 88 into the position shown in Fig. 8, and during this swinging movement the flanges will be withdrawn from the path of movement of the nozzle 9 and thereby disengaged therefrom. This disengagement of the flanges 98, 99 from the nozzle 9 is accomplished through the operation of the link 96.

After the pad has been inflated and the valves continue to move along the line of travel indicated at 100 the engagement of the valve with the flanges 98, 99 causes the arm 87 to swing forwardly and during this swinging movement the link 96 withdraws the extensible member 90 as shown in Fig. 8, such withdrawing movement being sufficient to withdraw the flange 98 from engagement with the valve. As soon as this occurs the arm 87 is swung to the left into the position shown in Fig. 7 ready to receive the nozzle 9 of the next unit. This return movement of the arm 87 is accomplished through the medium of a spring 111 which is shown as connected to an arm 112 pivoted at 113, which arm is connected by a link 114 to the arm 87.

I have stated above that there is also provided means for automatically deflating each pad as the corresponding sole-pressing unit comes into loading position. In the present construction the arm 112 is part of this deflating mechanism. Said arm carries at its end a stem 119 which is vertically movable through the arm 112 and said stem carries at its upper end a plate 120. The lower end of the stem is provided with a roll 121 adapted to run on a track 122 provided with a cam portion 123. In the normal position the roll 121 is on the low portion of the track 122 as shown in Fig. 6 and in this position the plate 120 is just below the line of travel of the end of the valve stem 78. As the arm 87 is swung to the right in Fig. 7 by the engagement of the nozzle 9 therewith such swinging movement operates through the link 114 to swing the arm 112 and as the arm 112 thus swings to the right the roll 121 will roll up the inclined portion 123 of the track 122 thereby raising the stem 119 and the plate 120. This rising movement brings the plate 120 against the end of the valve stem 78 thereby opening the valve 75 and deflating the pad.

It will be remembered that the swinging movement of the arm 112 which causes deflation of a pad that is approaching loading position is caused by the swinging movement of the arm 87 and the latter derives its swinging movement by the forward movement of the articulated units due to the fact that the pad nozzle 9 of the unit which has just previously been inflated is in engagement with the aligning flanges 98, 99 as shown in Fig. 7. When the connected units have moved forward sufficiently so that the aligning flanges 98, 99 are withdrawn from engagement with the nozzle 9 as shown in Fig. 8 then the spring 111 returns both the arms 87 and 112 to their initial positions.

Each pad is thus deflated as the corresponding unit moves into loading position and hence when each unit arrives at loading position the shoe therein can be readily removed and another shoe with its assembled sole placed in the unit with the deflated pad, after which the pad is inflated and the connected units are moved forward again one step. In Figs. 1 and 6 the unit which is in loading position is designated 1a and the unit which is approaching loading position and which is about to be deflated is designated 1b.

During the movement of each unit through the step which carries it from position 1b to position 1c the pad will be deflated. Just before the unit reaches the position 1c the arm 87 will be released and the spring 111 will return the arm 112 to its initial position. The unit is, therefore, deflated while at rest in the position 1c and it remains deflated during the next forward step or until it reaches the position indicated at 1a. In moving from the position shown in 1a to the next position to the left in Fig. 1 the pad is inflated as stated above.

A shoe and its assembled sole may be placed in each unit when it reaches the position shown at 1a, which, as stated above, is designated as the loading position. As the unit moves forward for the next step, which is toward the right in Fig. 6 and toward the left in Fig. 1, the pad will be inflated as above described.

Figure 2:
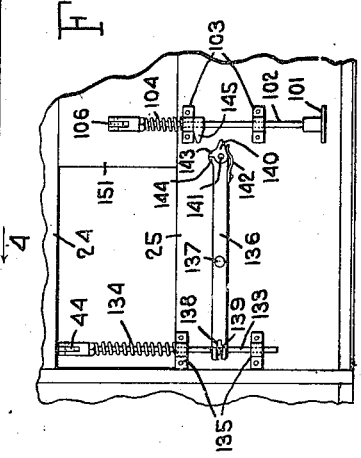
Fig. 2 shows a modified form of control means.

In the construction shown in Figs. 1 to 6 there is one treadle 40 for actuating the driving and stopping mechanism and another treadle 101 by which the pads are inflated. I have shown in Fig. 2 an embodiment of the invention wherein both these operations are performed by the treadle 101. In other words, the construction shown in Fig. 2 is one wherein the depression of the treadle 101 will operate not only to inflate the pad but also to unlock the sprocket wheel assembly 14 and throw the clutch into engagement.

In the construction shown in Fig. 2 the treadle 40 is omitted but the lever 44, see Fig. 4, is pivotally connected at its upper end to a rod 133 which corresponds to the treadle rod 41 of Fig. 4, said rod being mounted for vertical movement in bearings 135 and being acted on by a spring 134 which normally holds it in elevated position. This rod 133 has a pin 139 occupying a slot 138 of a lever 136 pivoted to the frame of the machine at 137. The other end of the lever 136 has an extension 140 pivoted thereto at 141 in such a manner as to permit the nose of the extension to swing downwardly from normal position but to prevent it from swinging upwardly from said normal position.

As shown the extension 140 is provided with a finger 143 adapted to engage a stop 144 on the end of the lever 136, the engagement of the finger with the stop preventing the nose of the extension 140 from swinging upwardly. This nose is, however, free to swing downwardly. 142 is a leaf spring bearing on the extension 140 and normally holding it in the position shown in Fig. 2.

The treadle rod 102 of the treadle mechanism by which the pads are inflated is provided with a finger 145. When the treadle 101 is depressed the finger 145 wipes by the extension 140, the latter swinging downwardly to permit this operation. It will be remembered that the depressing of the treadle 101 couples the two nozzles 178 and 9 together thereby causing the inflation of the pad. When the treadle 101 is released the spring 104 raises the treadle and separates the nozzles 178 and 9 and during the upward return movement of the treadle rod 102 the finger 145 engages the extension 140 and swings the lever 136 counter-clockwise in Fig. 2 thereby depressing the rod 133. The downward movement of the rod 133 operates through the lever 44 to unlock the sprocket wheel assembly 14 and to clutch the pulley 37 to the power shaft 35 as above explained. With the construction shown in Fig. 2, therefore, the operator has only one treadle to manipulate and the manipulation of this treadle serves both to inflate the pad which has just been loaded and then to start the driving mechanism which operates to move the endless chain structure of units forward one step.

In Figs. 13 and 14 I have shown a modified form of pad-inflating means by which the nozzles 178 and 9 are coupled together during the movement of the unit and without the necessity of depressing the treadle 101. In the construction shown in said Figs. 13 and 14 the lever 106 to which the treadle rod 102 is connected is provided at its free end with a head 150 to which a plate 146 is pivoted at 147. This plate can be swung upwardly into the inclined position shown in dotted lines Fig. 14 and when in its raised position it lies in the path of movement of the roll 110 carried at the lower end of the thrust rod 92 so that as the roll rides in a curvilinear path up the inclined plate the thrust rod will be elevated and the nozzles 9 and 178 will be coupled together.

The pivoted plate 146 has an arm 149 depending therefrom which is pivotally connected to the end of a lever 148, which lever is pivoted coaxially with the lever 106. The outer end 152 of the lever projects through a slot 154 in the wall 151 of the housing which encloses the inflating and deflating mechanism and this slot is provided with a downwardly-facing shoulder 155. If the outer end 152 of the lever 148 is depressed into the dotted line position of Fig. 13 and then engaged with the shoulder 155 the plate 146 will be held in its raised inclined position shown in dotted lines in Fig. 14. With the parts thus arranged the coupling of the nozzles 9 and 178 will be automatically performed as the roll 110 rides up the inclined plate 146 thereby dispensing with the necessity of manually manipulating a treadle to effect the coupling of the nozzles.

While I have illustrated herein some selected embodiments of the invention I do not wish to be limited to the constructional features shown.

I claim:

1. A sole-pressing machine having a travelling sole-pressing unit comprising an inflatable pad and means to hold a shoe with the sole in position to receive pressure from the pad when inflated, a horizontally-swinging air-delivery nozzle, and means to move said nozzle vertically and thereby couple it to said unit during the travelling movement thereof thereby to inflate the pad.

2. A sole-pressing machine having a travelling sole-pressing unit comprising an inflatable pad having an air-inlet nozzle and means to hold a shoe with the sole in position to receive pressure from the pad when inflated, a movable air-delivery nozzle, means to align said nozzles during the travelling movement of said unit, and means operative while the unit is travelling to couple said nozzles together, whereby air is delivered to the pad to inflate the latter during its travelling movement.

3. A sole-pressing machine having a travelling sole-pressing unit comprising an inflatable pad, means to hold the shoe with the sole in position to receive pressure from the pad when inflated and an air inlet nozzle, a swinging arm, an air-delivery nozzle carried thereby, means to bring said nozzles into alignment during the travelling movement of the unit, and means to couple the nozzles, whereby air is delivered to the pad to inflate the latter.

4. A sole-pressing machine having a travelling sole-pressing unit comprising an inflatable pad having a combined inlet and discharge nozzle and means to hold the shoe with the sole in position to receive pressure from the pad when inflated, a movable air-delivery nozzle, means to couple said nozzle to said combined inlet and discharge nozzle at one point in the travelling movement of the unit thereby to inflate the pad, and means cooperating with said combined inlet and discharge nozzle to deflate the pad at another point in its travelling movement.

5. A sole-pressing machine having a travelling sole-pressing unit comprising an inflatable pad, means to hold the shoe with the sole in position to receive pressure from the pad when inflated, means to move the unit forward with a step-by-step movement, a swinging member, an air-delivery nozzle carried thereby, means to couple said nozzle to said unit at one point in its travelling movement thereby to inflate the pad, and means to deflate the pad at another point in its travelling movement.

6. A sole-pressing machine having a travelling sole-pressing unit comprising an inflatable pad and means to hold a shoe with the sole in position to receive pressure from the pad when inflated, said unit having an air-inlet nozzle, a movable air-delivery nozzle, means to bring said nozzles into register during the travelling movement of said unit, manual means operative during such travelling movement to couple said nozzles thereby to inflate the pad, and means cooperating with said air-inlet nozzle to deflate the pad at another point in the travelling movement of said unit.

7. A sole-pressing machine having a travelling sole-pressing unit comprising an inflatable pad and means to hold a shoe with the sole in position to receive pressure from the pad when inflated, said unit also having an air-inlet nozzle, an inwardly-opening check valve therein, a movable air-delivery nozzle having a recess adapted to receive the end of the air-inlet nozzle, a check valve in the air-delivery nozzle, means to couple said nozzles by entering the end of the air-inlet nozzle into the recess of the air-delivery nozzle, each valve having means to unseat the other valve when the nozzles are thus coupled, and means cooperating with said air-inlet nozzle to deflate the pad at another point in its travel.

8. A sole-pressing machine having a plurality of connected travelling sole-pressing units, each comprising an inflatable pad, means to hold a shoe with the sole in position to receive pressure from the pad when inflated and an air-inlet nozzle through which the pad is inflated, means to move said connected units forward with a step-by-step movement, swinging member, an air-delivery nozzle carried thereby, means to couple said nozzle to each air-inlet nozzle when the corresponding unit reaches a predetermined point in its travel and to maintain such coupled relation of the nozzles during further traveling movement of the unit, whereby said pad is inflated during its traveling movement, and means to deflate each pad at another point in its travelling movement.

9. A sole-pressing machine having a plurality of connected sole-pressing units, each comprising an inflatable pad, means to hold a shoe with the sole in position to receive pressure from the pad when inflated, and an air-inlet nozzle through which the pad is inflated, a swinging arm, an air-delivery nozzle carried thereby, means to align said air-delivery nozzle with each air-inlet nozzle when the corresponding unit reaches a predetermined point in its travel, and means to couple said nozzles thereby to inflate the pad, said air-delivery nozzles becoming disconnected from each air-inlet nozzle during the movement of the corresponding unit following its inflation.

10. A sole-pressing machine having a plurality of connected sole-pressing units, each comprising an inflatable pad, means to hold a shoe with the sole in position to receive pressure from the pad when inflated, and an air-inlet nozzle through which the pad is inflated, a swinging arm, an air-delivery nozzle carried thereby, means to align said air-delivery nozzle with each air-inlet nozzle when the corresponding unit reaches a predetermined point in its travel, means to couple said nozzles thereby to inflate the pad, said air-delivery nozzle becoming disconnected from each air-inlet nozzle during the movement of the corresponding unit following its inflation, and means to deflate each pad at another predetermined point in its travelling movement.

11. A sole-pressing machine having a plurality of connected travelling sole-pressing units each comprising an inflatable pad, means to hold a shoe with the sole in position to receive pressure from the pad when inflated, feeding means for feeding the connected units forward, a clutch for operating said feeding means, manual means to throw the clutch into engagement, mechanically-controlled means for automatically disengaging the clutch when the connected units have travelled forward a predetermined distance, a swinging member, an air-delivery nozzle carried thereby, means to couple said nozzle to the pad of each unit when the latter reaches a predetermined point in its travelling movement, whereby the corresponding pad is inflated, and means to deflate each pad at another point in the travelling movement.

12. A sole-pressing machine having a plurality of sole-pressing units connected in the form of an endless chain structure, each unit comprising an inflatable pad, means to hold a shoe with the sole in position to receive pressure from the pad when inflated, and an air-inlet nozzle, two sprocket wheel assemblies around which the endless chain structure passes, means to rotate one of said sprocket wheel assemblies intermittently, whereby the endless chain structure is fed forward with a step-by-step motion, a swinging member, an air-delivery nozzle carried thereby, means to couple said air-delivery nozzle with each air-inlet nozzle as the corresponding unit reaches a predetermined point in its travelling movement, whereby the corresponding pad is inflated, and means to deflate each pad at another point in its travelling movement.

13. A sole-pressing machine having a plurality of sole-pressing units connected in the form of an endless chain structure, each unit comprising an inflatable pad having a combined air inlet and discharge nozzle, and means to hold a shoe with the sole in position to receive pressure from the pad when inflated, two sprocket wheel assemblies around which the endless chain structure passes, a power shaft for giving rotation to one sprocket wheel assembly, a clutch for actuating the power shaft, manual means to throw the clutch into operation, means controlled by the driven sprocket wheel assembly to disengage the clutch when the endless chain structure has been moved forward a predetermined distance, means cooperating with the combined air-inlet and discharge nozzle of each unit to inflate the corresponding pad at one point in its travelling movement, and other means cooperating with said nozzle to deflate each pad at another point in its travelling movement.

14. A sole-pressing machine having a traveling sole-pressing unit comprising an inflatable pad and means to hold a shoe with the sole in position to receive pressure from the pad when it is inflated, said unit having an air-inlet nozzle through which the pad is inflated, a swinging air-delivery nozzle, nozzle-aligning means carried by the air-delivery nozzle and normally situated in the path of movement of the air-inlet nozzle, whereby upon engagement of the air-inlet nozzle with said nozzle-aligning means the two nozzles are brought and held into alignment during the traveling movement of the sole-pressing unit, and means to couple said nozzles together thereby to inflate the pad.

15. A sole-pressing machine having a traveling sole-pressing unit comprising an inflatable pad and means to hold a shoe with the sole in position to receive pressure from the pad when it is inflated, said unit having an air-inlet nozzle through which the pad is inflated, a swinging air-delivery nozzle, nozzle-aligning means carried by the air-delivery nozzle and normally situated in the path of movement of the air-inlet nozzle, whereby upon engagement of the air-inlet nozzle with said nozzle-aligning means the two nozzles are brought and held into alignment during the traveling movement of the sole-pressing unit, and means operative while the pad is traveling to couple the nozzles together thereby to inflate said pad.

16. A sole-pressing machine comprising a traveling sole-pressing unit in the form of an inflatable pad and having means to hold a shoe with the sole in position to receive pressure from the pad when it is inflated, said unit having a depending air-inlet nozzle, a swinging air-delivery nozzle provided with a nozzle-aligning flange normally situated in the path of movement of the air-inlet nozzle whereby engagement of the air-inlet nozzle with said flange brings the nozzles into alignment and maintains such alignment during traveling movement of the sole-pressing unit, and means to couple said nozzles while so aligned thereby to inflate the pad.

17. A sole-pressing machine comprising a traveling sole-pressing unit in the form of an inflatable pad having means to hold a shoe with the sole in position to receive pressure from the pad when it is inflated, said unit having a depending air-inlet nozzle, a horizontally-swinging air-delivery nozzle having an upstanding nozzle-aligning flange normally situated in the path of movement of the depending air-inlet nozzle, whereby engagement of said air-inlet nozzle with said flange brings the nozzles into alignment and maintains such alignment during traveling movement of the sole-pressing unit, and means to couple said nozzles while so aligned thereby to inflate the pad.

18. A sole-pressing machine having a traveling sole-pressing unit comprising an inflatable pad and means to hold the shoe with the sole in position to receive pressure from the pad when it is inflated, said pad having an air-inlet nozzle, a movable air-delivery nozzle, one of said nozzles having an angular aligning flange presenting two meeting walls situated at an angle to each other and occupying planes extending at right angles to the direction of movement of the sole-pressing unit, whereby when the other nozzle engages said flanges it is positioned in the apex thereof and thus aligned with the first-named nozzle, and means to couple the aligned nozzles thereby to inflate the pad.

19. A sole-pressing machine having a traveling sole-pressing unit comprising an inflatable pad and means to hold a shoe with the sole in position to receive pressure from the pad when it is inflated, said pad having an air inlet nozzle, a movable air-delivery nozzle having an aligning flange presenting two walls situated at an angle to each other and occupying planes at right angles to the direction of the movement of the sole-pressing unit and adapted to be directly engaged by the air inlet nozzle during the movement of the sole-pressing unit whereby the nozzles are aligned, and means to couple the aligned nozzles thereby to inflate the pad.

MAURICE BARRY.